United States Patent
Chapman et al.

(10) Patent No.: US 6,915,130 B1
(45) Date of Patent: Jul. 5, 2005

(54) METHOD AND APPARATUS FOR SCAN OPERATION IN AN INTEGRATED VOICE AND DATA COMMUNICATION SYSTEM

(75) Inventors: Mark D. Chapman, Marengo, IL (US); Thomas P. Ryan, Palatine, IL (US); Stanley J. Knapczyk, Justice, IL (US); Carlton R. Van Tassle, Algonquin, IL (US)

(73) Assignee: Motorola, Inc., Schaumburg, IL (US)

( * ) Notice: Subject to any disclaimer, the term of this patent is extended or adjusted under 35 U.S.C. 154(b) by 1061 days.

(21) Appl. No.: 09/593,028

(22) Filed: Jun. 13, 2000

(51) Int. Cl.[7] ............................................... H04B 1/38
(52) U.S. Cl. ....................................... 455/434; 455/574
(58) Field of Search ................................. 455/574, 434, 455/455, 515, 516; 370/311

(56) References Cited

U.S. PATENT DOCUMENTS 5,870,673 A * 2/1999 Haartsen .................. 455/426.1
6,292,508 B1 * 9/2001 Hong et al. ................. 375/134
6,463,307 B1 * 10/2002 Larsson et al. ............. 455/574
6,549,778 B1 * 4/2003 Mulford ................... 455/426.1

* cited by examiner

Primary Examiner—Nick Corsaro
(74) Attorney, Agent, or Firm—Steven R. Santema; Indira Saladi

(57) ABSTRACT

The invention relates to a scan mode of operating for a communication system that supports both voice and data communication services. Prior to entering the scan mode, a mobile station (28) provides a message to the fixed network equipment, and particularly a data controller (22) within the fixed network equipment, that it is entering scan mode. When exiting scan mode, the mobile station (28) sends a message to the data controller (22) indicating that it is no longer in scan mode. With knowledge of whether the mobile station (28) is in scan mode, the data controller (22) sends data messages to the mobile station using a preamble. The preamble may include a plurality of short confirmed message packets (606) and each may contain a preamble list of mobile stations to which data messages are scheduled to be sent.

23 Claims, 4 Drawing Sheets

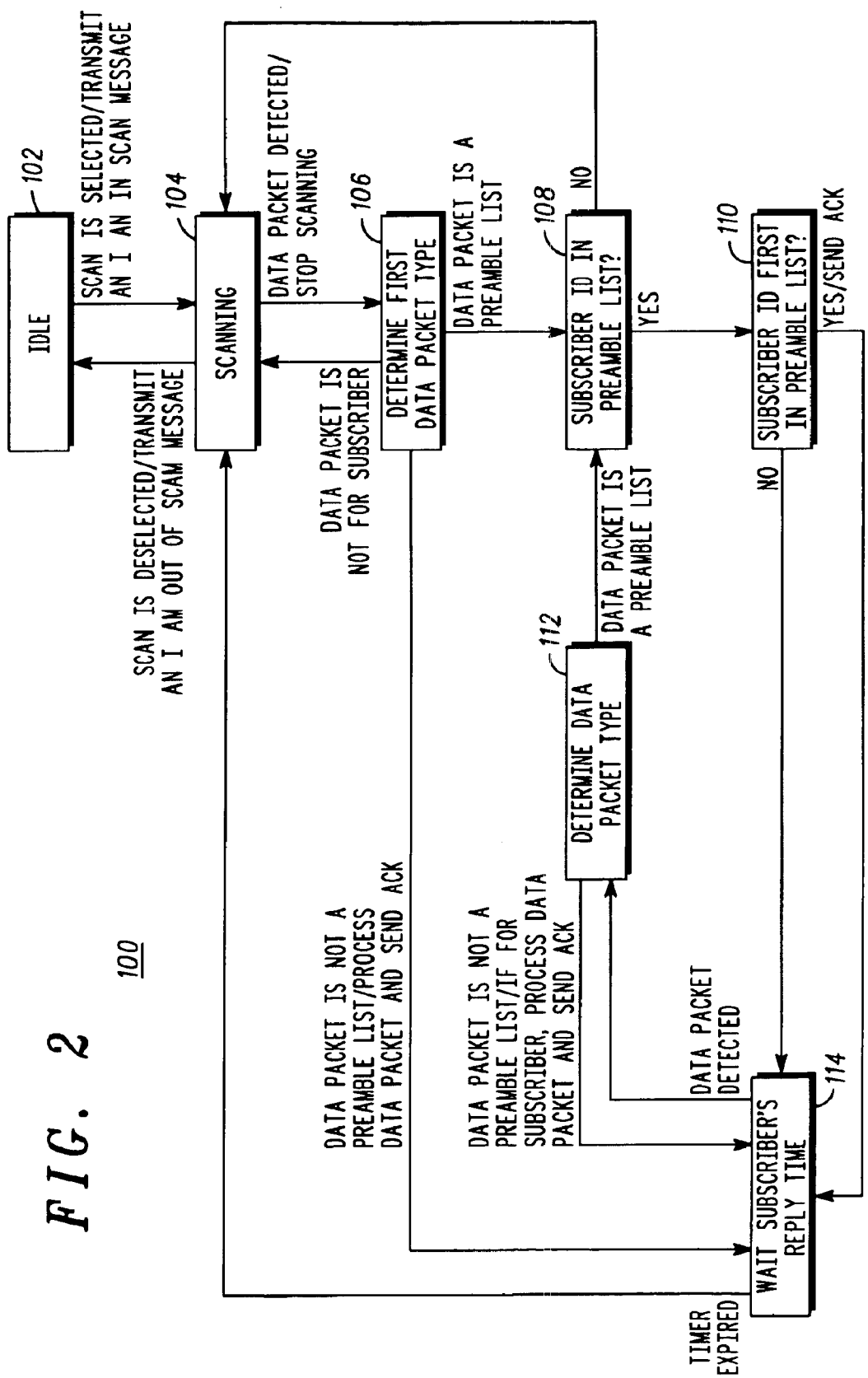

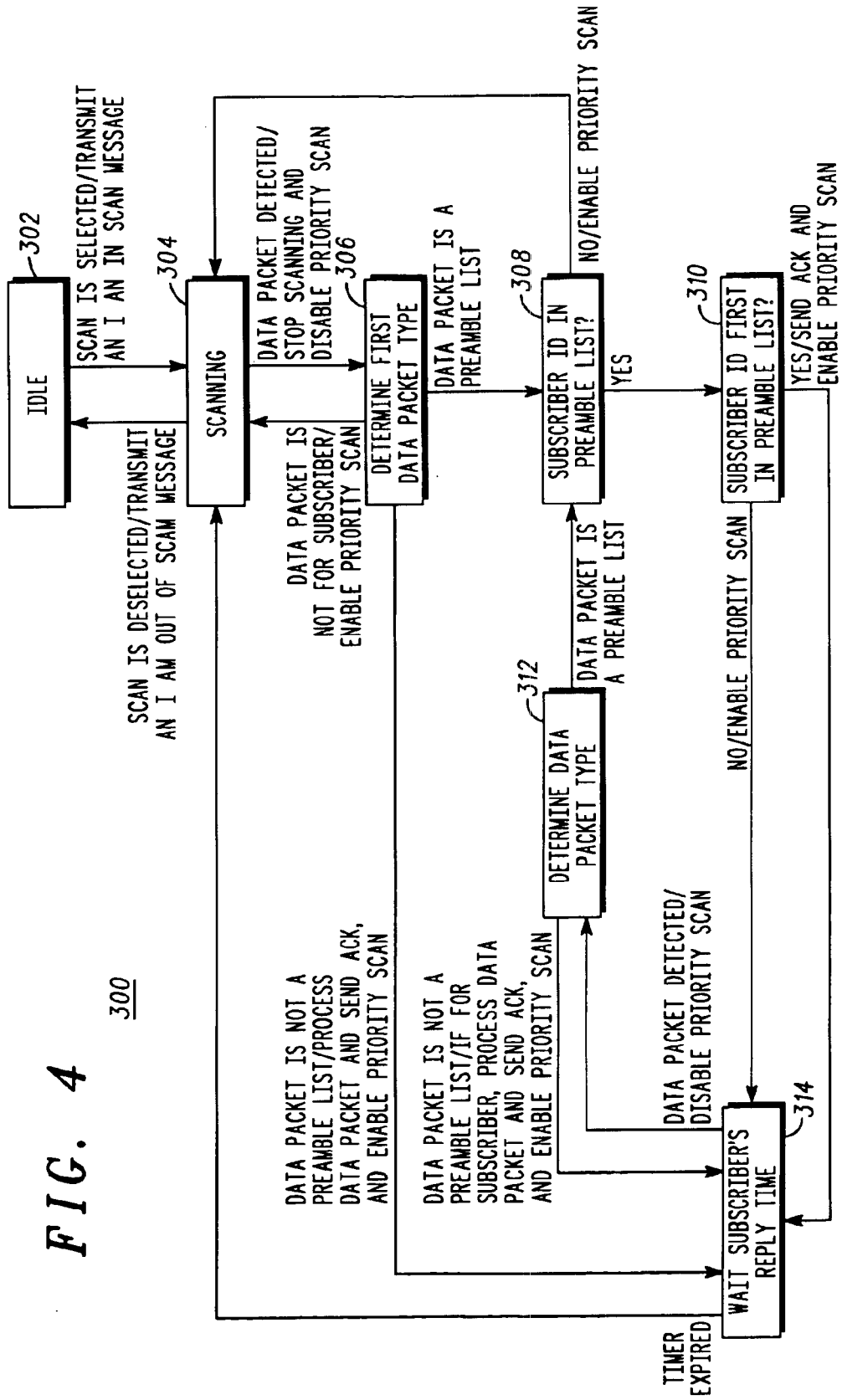

METHOD AND APPARATUS FOR SCAN OPERATION IN AN INTEGRATED VOICE AND DATA COMMUNICATION SYSTEM

FIELD OF THE INVENTION

The present invention relates generally to communication systems, and more particularly to a method and apparatus for providing scan mode operation in a communication system that supports both voice and data communications.

BACKGROUND OF THE INVENTION

Wireless communication systems support and provide a wide variety of features and functions for their users. For example, conventional voice/data systems allow a subscriber/mobile station to monitor multiple communication channels provided by the fixed network equipment for traffic that is of concern to that mobile station. This is typically referred to as the mobile station being in "scan mode." Scan mode allows a mobile station to check a succession of radio channels on a periodic basis to determine if voice information is present, and then to remain on that channel to receive the voice information. At times, this means that the mobile station will arrive on the channel in mid-transmission.

Transmitted voice, whether sent in analog or digital form, is designed to readily allow a late entry into the transmission through the periodic inclusion in the voice transmission of synchronization (sync) and destination ID information. The periodic inclusion of this information permits the mobile station to determine that the voice information is intended for that station, and allows the mobile station to receive the subsequently transmitted, although incomplete information.

An enhanced form of scan mode is referred to as priority scan. In priority scan the user may designate certain channels, typically 1 or 2 channels, as priority channels. These channels are scanned more frequently, usually every other channel as the mobile station advances through its scan channels list. Moreover, if the mobile station is receiving a transmission on a non-priority channel, it will, during reception, scan to the priority channels on a periodic basis. This act of scanning interrupts the transmission on the non-priority channel for the duration of the priority scan cycle.

Incomplete reception of data information, and more particularly a data packet, will result in an error for the entire data packet. In part, this is due to the fact that data packets are fairly short in duration and include sync and destination information only at the beginning of the packet. If the sync and destination information are not received, the content of the data packet cannot be received. In addition, outbound data packets are unsolicited, asynchronous events so the mobile station has no way of knowing when or on what channel a data packet will arrive. The act of changing frequencies is bound to leave the mobile station on either the wrong frequency or arriving on the correct frequency in the middle of the data packet, thus resulting in an error in reception of the data packet. The effect is missed packets and an avalanche of retries developing in the system. The increasing number of retries cause a reduction in the available capacity for the data that the system is attempting to send. Priority scan exacerbates the problem by almost assuring that data packets will be interrupted or not received entirely.

Because of these problems with receiving data information while the mobile station is in either scan mode or priority scan, in some instances the availability of scan mode and priority scan has been limited to those users who do not require data reception. Alternatively, to allow both scan mode and data reception, a lengthy preamble is inserted in front of each data packet sent within the system. The lengthy preamble increases the probability that when the scanning mobile station arrives on a channel, a portion of the preamble is still present. The mobile station detects the preamble and remains on the channel to receive the data packet. However, in such an arrangement, the preamble must be as long as the time necessary to complete the scan sequence. The scan sequence may be several seconds in length. Thus, the preamble would have to be several seconds in duration, which in most cases will be many many times the length of the data packet being transmitted. The direct result is that the amount of information that can be carried on the channel is greatly reduced.

Thus, there is a need for a method and apparatus for permitting scan mode and priority scan with data reception in an integrated voice/data communication system without significantly degrading the information carrying capacity of the communication channel.

BRIEF DESCRIPTION OF THE DRAWINGS

FIG. 2 is a chart illustrating the operating states of a method for providing scan operation at a mobile station in accordance with a preferred embodiment of the invention.

FIG. 4 is a chart illustrating the operating states of a method for providing scan operation at a mobile station in accordance with an alternate preferred embodiment of the invention.

DETAILED DESCRIPTION OF THE PREFERRED EMBODIMENTS

The present invention provides a scan mode of operating in a communication system that supports both voice and data communication services. Prior to entering the scan mode, the subscriber/mobile station (subscriber and mobile station are used throughout to refer to a communication unit such as a cellular radiotelephone, a two-way radio, a mobile data terminal or similar device) provides a message to the fixed network equipment, and particularly a data controller within the fixed network equipment, that it is entering scan mode. When exiting scan mode, the mobile station sends a message to the data controller indicating that it is no longer in scan mode. With knowledge of whether the mobile station is in scan mode, the data controller sends data messages to the mobile station using a preamble. With the mobile station out of scan mode, the data controller has the channel location of the mobile station and the preamble is unnecessary.

With the mobile station in scan mode, the data controller does not have its channel location and a preamble is necessary. The preamble may contain a plurality of short confirmed message packets. Each short confirmed message packet might contain a preamble list including mobile station identification information. Upon detecting the preamble on a scanned channel, the mobile station pauses on that channel. If the mobile station identification information includes the identification of the mobile station, the mobile station remains on the channel to receive a pending data message. The mobile station will remain on the channel for a predetermined period of time following the last successfully received data message, as measured by a timer, in order to receive subsequent data messages without the use of a preamble. In this manner, the invention provides for reliable and efficient communication of data while preserving the scan mode for the mobile station. Still other advantages and features of the invention will be appreciated from the following detailed description of several preferred embodiments.

Figure 1:
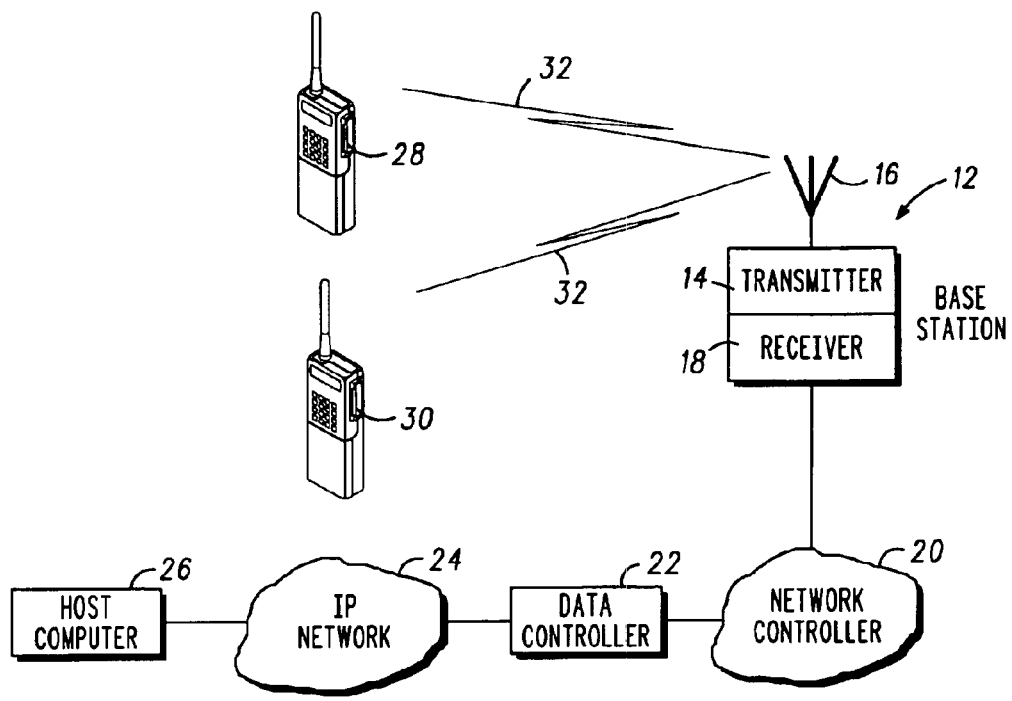
FIG. 1 is an illustration of communication system adapted in accordance with the preferred embodiments of the invention.

Referring to FIG. 1, a communication system 10 includes a base station 12 having a transmitter 14 and a receiver 18 coupled to an antenna 16. The base station 12 is coupled to a radio network controller 20, which is further coupled to a data controller 22 and via a packet network, such as IP network 24, to a host computer 26. A first mobile station 28 and a second mobile station 30 operate in the coverage area of the communication system 10 and communicate with the base station 12 via radio signals generally illustrated as 32. The signals 32 are carried on a plurality of communication channels that may be provided by base station 12, or by base station 12 and additional base stations (not depicted), forming communication system 10. Either mobile station 28 or 30 may operate in a scan mode, wherein the mobile station scans from communication channel to communication channel. Furthermore, each mobile station 28 and 30 may receive data messages, such a data packets, while operating in the scan mode. The host computer 26 accepts data messages for transmission to either or both of mobile stations 28 and 30. A data message is carried via the IP network 24 to the data controller 22 where it is processed for delivery via the radio network controller 20 and base station 12 to the intended mobile station 28 or 30.

FIG. 2 illustrates a scan mode 100 of operating for either mobile station 28 or 30. To illustrate the invention, the following discussion refers to mobile station 28, although the discussion is equally applicable to mobile station 30. While in an idle state 102, mobile station 28 is on a particular channel and is not scanning. The mobile station 28 enters scan mode 104 by manual selection by the user of the mobile station 28. Before transitioning into the scan mode 104, the mobile station 28 transmits a message, such as an "I am in scan" message, to the fixed network equipment, i.e., base station 12 and data controller 22.

While in the scan mode 104 the mobile station 28 sequences through a predetermined list of channels in round robin fashion, checking for channel activity at each. If scan is deselected by the user, the mobile station 28 transmits a message, such as an "I am out of scan" message to the data controller 22 and returns to the idle state 102.

While in scan, if a data message is detected on a channel, the mobile station 28 transitions to the determine the data message type state 106. There are several possible data message types, and three are described herein. The data message may be a data message that is not addressed to the mobile station 28. If this is the case, the mobile station 28 returns to scan mode 104. The data message may be addressed to the mobile station 28 and it may be a preamble list, and the mobile station 28 will transition to the subscriber ID in preamble list state 108. The data message may be a data message addressed to the mobile station 28 and is not a preamble list. In this later case, the mobile station 28 processes the data message, sends an acknowledgement to the data controller 22 and moves to the wait subscribers reply time state 114.

The subscriber ID in preamble list state 108 has two possible outcomes. If the subscriber/mobile station ID is in the preamble list, then the mobile station 28 moves to the subscriber ID first in preamble list state 110. If the mobile station ID is not in the preamble list, then no data packets for the mobile station 28 are expected and the mobile station 28 returns to the scan mode 104.

The subscriber ID first in preamble list state 110 has two possible outcomes. If the subscriber/mobile station ID is the first one in the list, the mobile station 28 must send an acknowledgement that it has received the preamble list data packet to the data controller 22. The mobile station then transitions to the wait subscriber's reply time state 114.

While in the wait subscribers reply time state 114, the mobile station 28 waits on the channel where the data message was detected to receive additional data messages, i.e., data packets. If a data packet is detected, the mobile station 28 moves to the determine packet type state 112. If no data packets are detected and the predetermined time period expires, as measured by the subscriber reply time timer, the mobile station 28 returns to the scan mode 104. If the first ID in the data message was not that for mobile station 28, it is expected that data packets intended for other mobile stations will be received first. If, for example, the ID for mobile station 28 appeared third in the list, it would be expected that the third data packet received would be for mobile station 28, but not necessarily so. Therefore, the mobile station 28 may transition between the determine packet type state 112 and the wait subscriber reply time state 114 several times before receiving its data packet.

The determine packet type state 112 has two possible outcomes. If the received data packet is a preamble list, then the mobile station 28 moves to the subscriber ID in preamble list decision state 108. If the data packet is not a preamble list, then if it is addressed to the mobile station 28, the mobile station 28 processes the data packet, sends an acknowledgement and moves to the wait subscriber's reply time state 114. The only difference between the determine packet type state 112 and the determined packet type state 106 is that a data packet not addressed to the mobile station 28 causes the mobile station to return to the wait subscriber's reply time state 114 and not return to scan mode 104. The purpose for the difference is that, in order for the subscriber to be in the determine packet type state 112, it must have first received a preamble list with its ID in it or a data packet addressed to it. As a result, the mobile station 28 is likely to receive a data packet on the channel and should remain on the channel as long as activity is present.

Figure 3:
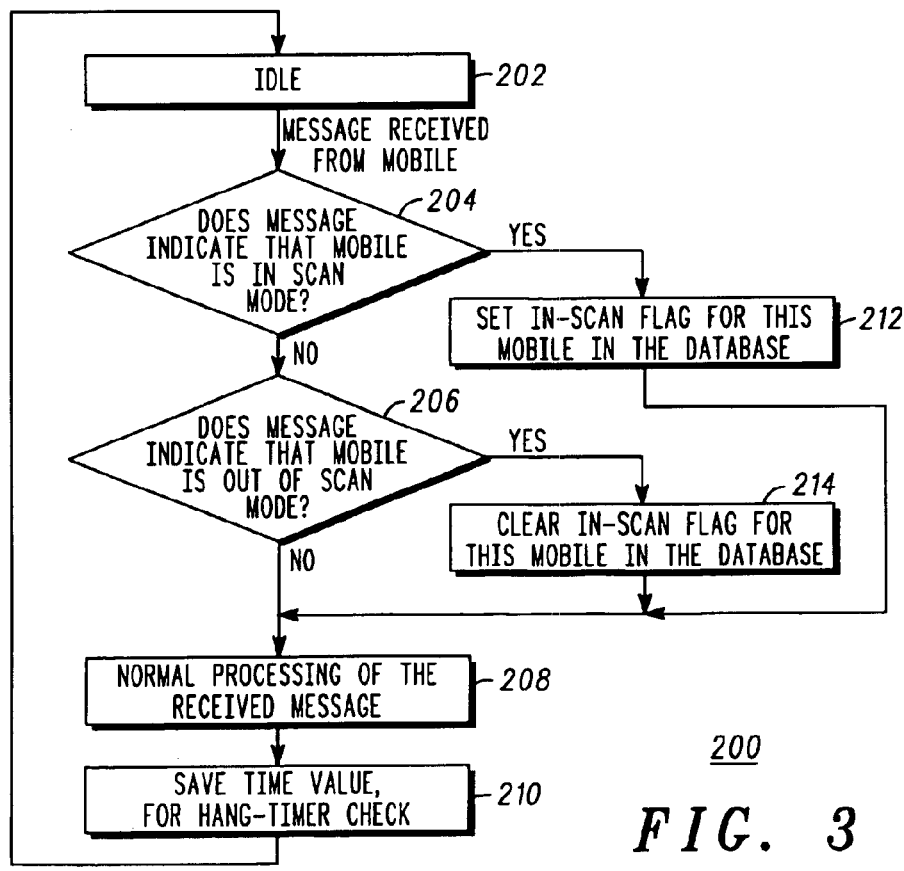
FIG. 3 is a chart illustrating the operating states of a method for providing scan operation at a base station or data controller in accordance with a preferred embodiment of the invention.

FIG. 3 illustrates a scan mode 200 of operating for the fixed network equipment, i.e., data controller 22. From an idle state 202 the data controller 22 receives a message from a mobile station, such as mobile station 28, and determines if the message indicates that the mobile station is in scan mode. If so, the data controller 22 sets at 212 an in-scan mode flag in a mobile database (not depicted) maintained within the data controller 22. The data controller 22 then continues with normal processing of the received message 208 and saves the received time value for a hang-time check 210. The hang-time check is associated with each mobile station in scan mode. A timer is reset after each packet acknowledgment is received from the mobile station, and will expire after a predetermined period of time. The duration of the timer is set to account for the reception of replies by the mobile station, and will expire following the predetermined period of time following the last outbound data packet for that mobile station. The timer accounts for the time the mobile station remains on the channel in the absence of data traffic for that mobile station and is used in accordance with the invention to send subsequent date packets without a preamble.

If the message does not indicate that the mobile station 28 is entering scan mode 104, but instead indicates that it is out of scan mode, 206, then the scan flag in the mobile database is cleared at 214. The data controller 22 then continues with normal processing of the received message 208 and saves the received time value for the hang-time check 210.

When a mobile station is not in scan mode, then the data controller 22 has its channel location and may send data messages to it using without using a preamble. However, when one or more mobile stations are known to be in scan mode, the data controller 22 first sends a preamble for data messages intended for those mobile stations in scan mode. In accordance with the preferred embodiments of the invention, the preamble includes a preamble list that identifies the mobile station or mobile stations to which data messages are directed. Preferably, the preamble list will contain the identification of the next "X" mobile stations to receive data messages. The mobile stations will detect the preamble, analyze the preamble list, identify its corresponding identification and remain on the channel for a pending data message. Thus a separate preamble is not required for each data message because the data controller 22 now knows the mobiles are migrating to the acknowledged channel.

Figure 6:
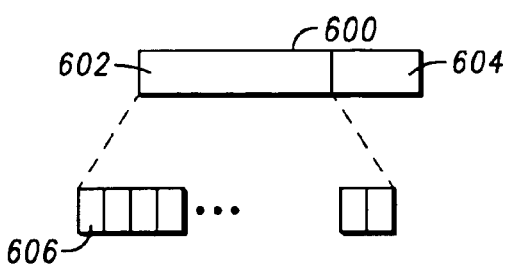
FIG. 6 is an illustration of a data message in accordance with a preferred embodiment of the invention.

With reference to FIG. 6, a data message 600 includes a preamble portion 602 and a data packet 604. The preamble portion 602 is preferably a plurality of short confirmed message packets 606, each of which contains the preamble list. The duration of the preamble is configurable by the data controller 22 to be slightly longer than the time needed for the longest scanning mobile station to cycle through its list of scanned channels when all channels are vacant of traffic. The preamble may be addressed "all_call", that is, its destination is to all mobile stations operating in scan mode in the communication system 10. The data packet 604 is the data packet intended for the mobile station identified first on the preamble list contained within the short confirmed message packets 606.

To reduce traffic due to the preamble transmission, in accordance with the preferred embodiments of the invention, the preamble is only applied to the first data packet to be transmitted to a mobile station in scan mode. Once a preamble has been sent and acknowledged, a preamble will not be added to subsequent data packets destined for that mobile station until the hang-time check timer has expired for that mobile station. This is possible because the acknowledgement will provided the data controller 22 with the necessary channel information to send additional data messages to the mobile station, and because the mobile station will be waiting on that channel for at least a predetermined period of time corresponding to the hang-time check timer.

It will be possible to reduce preamble traffic by further controlling when a preamble message will be sent. For example, a preamble will only be attached to a data message if the identification for the destination mobile station could not be inserted as part of a preamble list in an earlier sent and acknowledged preamble. This is possible because the mobile stations are continuously checking the preamble list. Once a mobile station identifies itself on the preamble list, it remains on the channel in anticipation of receipt of a data message. If the first identified mobile station does not acknowledge the preamble, the mobile identification may be inserted in the next available preamble, or a new preamble for that mobile station may be configured and placed before the first message for that mobile station.

Figure 7:
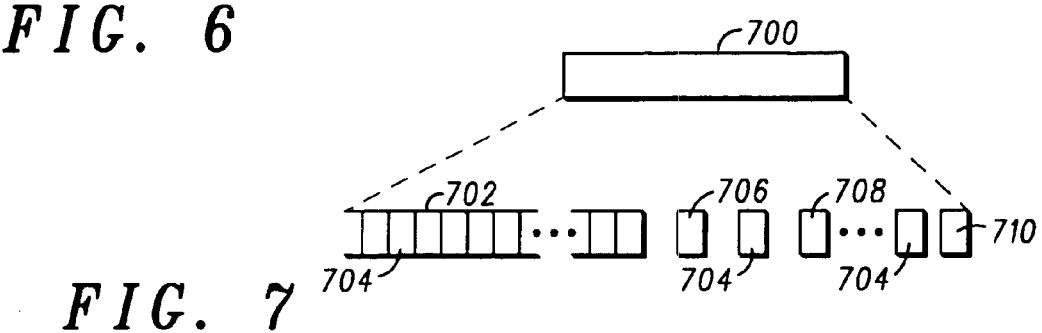
FIG. 7 is an illustration of a group of data messages in accordance with a preferred embodiment of the invention.

Because it is possible that a mobile station will come onto the channel following the preamble, the mobile station may not be able to determine that it is on the preamble list. With reference to FIG. 7, in another preferred embodiment of the invention, a group of data messages 700 includes a preamble portion 702 that is made up of a plurality of short confirmed message packets 704, each containing the preamble list. Following the preamble is a first data packet 706 intended for the first mobile station identified in the preamble list, a second data packet 708 intended for a second mobile station on the preamble list and an $n^{th}$ data packet 710 intended for the $n^{th}$ mobile station on the preamble list. Before the second data packet 708 there is a short confirmed message packet 704 containing the preamble list. Similarly, a packet 704 is inserted before the $n^{th}$ data packet 710. Thus, a mobile station coming onto the channel after the preamble and during a data packet, will receive the preamble list before the next transmission of a data packet. It will be appreciated that the preamble list contained in the packets 704 may be updated following each transmission of a data packet.

Referring to FIG. 4, a method 300 for providing a priority scan mode of operation is depicted. The method 300 is substantially similar to the method 100 illustrated in FIG. 2, and a description of the corresponding operations is not repeated here. Method 300 differs from the method 100 in that the mobile station, upon detecting a data packet at either the scan mode 304 or the wait subscriber's reply time state 314, will suspend priority scan. Also, once the data packet has been processed and an acknowledgment sent if necessary, the mobile station enables priority scan and schedules the next priority scan to occur substantially immediately. This is accomplished in the determine first data packet type state 306, determine data packet type state 312 or subscriber ID first in preamble list state 310. By enabling priority scan immediately after processing and acknowledging a data reception, the likelihood that another data packet will be received before the first priority sample is executed is small. Thus, the mobile station may sample the priority channel and return to the channel on which data reception occurred before a second data packet is sent by the data controller 22.

Figure 5:
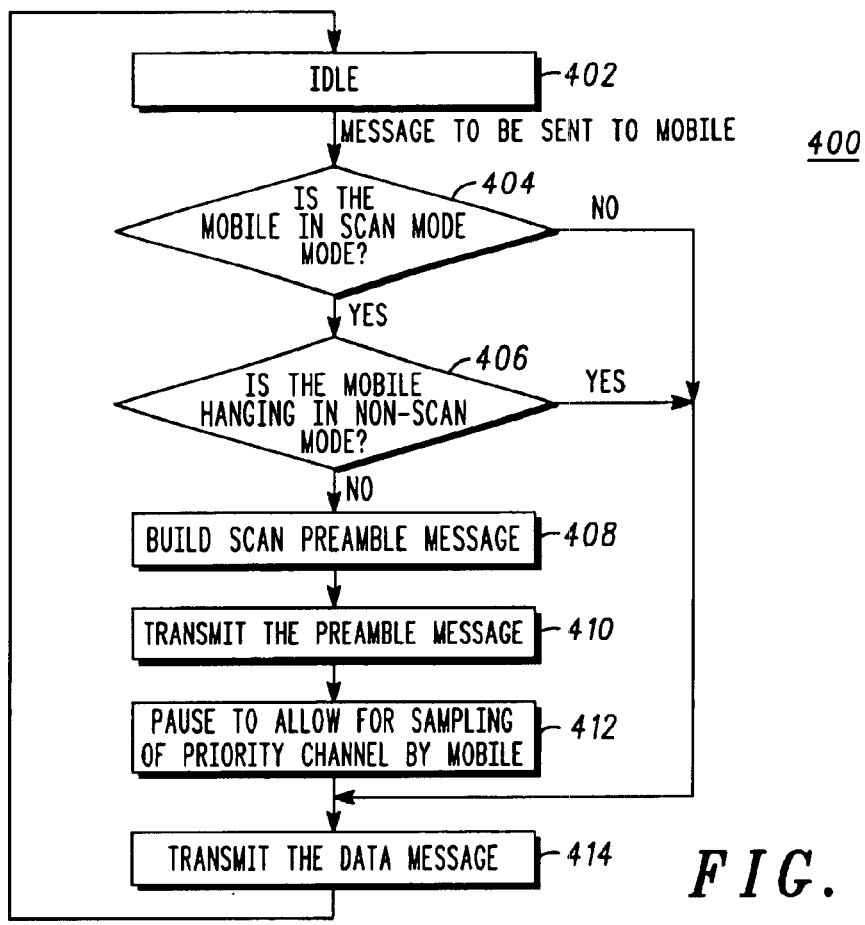
FIG. 5 is a chart illustrating the operating states of a method for providing scan operation at a base station or data controller in accordance with an alternate preferred embodiment of the invention.

Referring to FIG. 5, within the data controller 22 a method 400 for coordinating the transmission of data packets to a mobile station in priority scan is shown. From the idle state 402, the data controller 22 determines if the mobile station is in scan mode 404 by checking the scan mode flag. If the mobile station is not in scan mode, the date controller 22 sends the data message, 414. Otherwise, the data controller 22 checks if the mobile station is hanging in non-scan mode, 406. That is, is the mobile station waiting to receive data messages having sent an acknowledgement to a preamble list or a received data message. If so, the data controller 22 sends the data message, 414. Otherwise, the mobile station is in scan mode and not waiting for a data packet. The data controller 22 builds the preamble message, 408, and transmits it, 410, to the mobile station. The data controller 22 then pauses, 412, to allow the mobile station to perform a priority sampling as described above. The duration of the pause is determined to be substantially equal to the time necessary for the mobile station to jump to the priority channel, and providing there is no activity for it, to return to the data channel. The data controller 22 then sends the data message, 414. In this manner, the transmission of the data message is advantageously synchronized to the operation of the mobile station in priority scan mode.

The invention has been described in terms of several preferred embodiments. As described, the invention advantageously reduces the preamble traffic by eliminating packet-by-packet transmission of a preamble message, by providing within the preamble a preamble list of the next "X" message recipients and by providing a protocol for mobile stations to wait on-channel for data messages. The invention further permits priority scan operation by coordinating transmission of data messages with acknowledgment of the preamble. Additional features of the invention have also been described, and those of ordinary skill in the art will appreciate that alterations, modifications and additions may be made to the invention without departing from its fair scope as set forth in the sub-joined claims.

We claim:

1. In a communication system providing voice services and data services and further providing a scan mode, a method for facilitating data reception comprising the steps of:
   determining if a mobile station is in scan mode;
   when the mobile station is in scan mode, sending a data message using a preamble wherein the data message comprises a plurality of data packets with a short confirmed message between each of the plurality of data packets; and
   when the mobile station is not in scan mode, sending the data message without using the preamble.

2. The method of claim 1, wherein the step of determining if a mobile station is in scan mode comprises receiving a message from the mobile station indicating that the mobile station is in scan mode.

3. The method of claim 1, wherein the step of sending the data message using a preamble comprises the steps of:
   sending the preamble; and
   receiving an acknowledgement to the preamble.

4. The method of claim 3, further comprising, following the step of receiving an acknowledgement to the preamble, the step of sending a data message to the mobile station.

5. The method of claim 4, wherein the step of sending a data message comprises the steps of:
   sending a first data message; and
   sending a second data message without a preamble within a predetermined time period of sending the first data message.

6. The method of claim 5, wherein the predetermined time period corresponds to a reply time.

7. The method of claim 1, wherein the preamble comprises a preamble list.

8. The method of claim 7, wherein the preamble list contains an identification associated with the mobile station.

9. The method of claim 8, wherein the preamble list contains an identification associated with a second mobile station.

10. The method of claim 1, wherein the preamble comprises a plurality of short confirmed message packets.

11. The method of claim 1, wherein the preamble has a duration and wherein the duration is greater than or equal to a scan cycle duration for the mobile station.

12. The method of claim 1, wherein the plurality of data packets are directed to multiple mobile stations and wherein each short confirmed message packet comprises an identification associated with each of the multiple mobile stations.

13. The method of claim 1, further comprising the steps of:
   determining the mobile station to be in a priority scan mode;
   receiving an acknowledgement to the preamble; and
   pausing before sending the data message.

14. In a communication system providing voice services and data services and further providing a scan mode, a method for receiving data messages comprising the steps of:
   sending to a data controller an in scan mode message;
   scanning a plurality of channels;
   detecting a data message on a scanned channel wherein the data message comprises a plurality of data packets with a short confirmed message between each of the plurality of data packets;
   determining a data message type;
   processing the data message;
   waiting a predetermined period of time; and
   resuming scanning of the plurality of channels.

15. The method of claim 14, wherein the data message type is a preamble list, and the step of processing the data message comprises the step of detecting a mobile station identification on the preamble list.

16. The method of claim 15, further comprising, upon detecting the mobile station identification, the step of sending an acknowledgement to the data controller.

17. The method of claim 16, further comprising enabling a priority scan substantially immediately after the step of sending an acknowledgment.

18. The method of claim 14, further comprising, during the step of waiting a predetermined time period, detecting a second data message.

19. In a communication system providing voice services and data services to a mobile station operating within the communication system via a base station, an apparatus for providing a scan mode comprising:
   a data controller coupled to send a preamble and a data message to the mobile and to receive an in-scan mode message and an acknowledgment message from the mobile via the base station, the data controller including a scan mode database and being operable to generate the preamble, wherein
   with the mobile station in scan mode as determined by the data controller with reference to an entry in the scan mode database, the data controller sends the preamble message to the mobile station, receives from the mobile station the acknowledgment and sends the data message to the mobile; and
   wherein the data controller is further coupled to send a second data message to a second mobile station via the base station wherein the second data message comprises a shortened preamble comprising a short confirmed message.

20. The apparatus of claim 19, wherein the preamble comprises a preamble list containing an identification associated with the mobile station.

21. The apparatus of claim 20, wherein the preamble list contains an identification associated with at least one other mobile station.

22. The apparatus of claim 19, wherein the data controller further comprises a timer operable to provide a time-out indication relative to the acknowledgment, and wherein, prior to the time-out indication, the data controller is further operable to send a second data message to the mobile station.

23. In a communication system providing voice services and data services to a mobile station operating within the communication system via a base station, an apparatus for providing a scan mode comprising:

a data controller coupled to send a preamble comprising a plurality of short confirmed message packets and a data message to the mobile and to receive an in-scan mode message and an acknowledgment message from the mobile via the base station, the data controller including a scan mode database and being operable to generate the preamble, wherein with the mobile station in scan mode as determined by the data controller with reference to an entry in the scan mode database, the data controller sends the preamble message to the mobile station, receives from the mobile station the acknowledgment and sends the data message to the mobile.

* * * * *